Oct. 10, 1950 — LA VERN E. QUINNELL — 2,525,270
ELECTRIC PRIMARY CELL
Filed Feb. 21, 1945
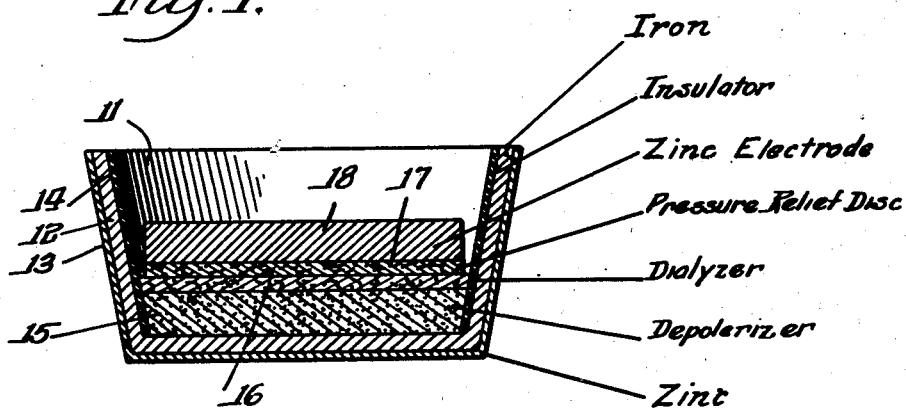
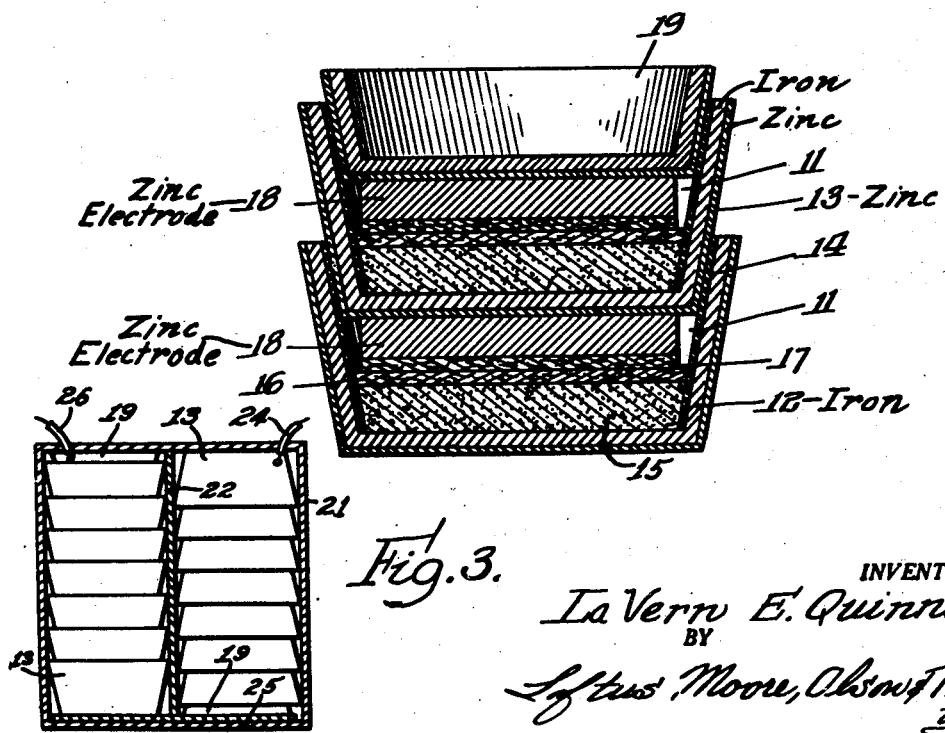
INVENTOR.
La Vern E. Quinnell Patented Oct. 10, 1950

2,525,270

UNITED STATES PATENT OFFICE 2,525,270

ELECTRIC PRIMARY CELL

La Vern Edward Quinnell, Fort Wayne, Ind., assignor to The Magnavox Company, Fort Wayne, Ind., a corporation of Delaware Application February 21, 1945, Serial No. 578,985

5 Claims. (Cl. 136—111)

The present invention relates to electric primary cells and more particularly to a primary cell of the type particularly adapted for assembly of a number of cells into a higher voltage battery.

In electric primary cells of the dry battery type it has long been recognized that it is desirable to provide a cell structure which is readily sealed so as to be vapor and electrolyte proof. In the instance of cells of the type commonly used for flash lights, outside casings have been provided which prevent any leakage of the cell within the flash light even though the life of the cell has reached its end. In multi-cell batteries, as in the case of B batteries considerable emphasis has been placed upon a compact structure as well as an arrangement whereby the individual cells are sealed so that an exhausted battery produces a minimum of leakage and resultant deterioration of the surrounding equipment.

It furthermore is desirable to provide cells for B battery construction which have a high shelf life and also a long use life.

In accordance with the present invention the above mentioned desirable attributes in the construction of batteries is obtained by an improved electric primary cell of the dry battery type which is so formed that each cell engages a succeeding cell to provide a vapor and electrolyte proof cell and to insure the best possible contact between successive cells. This is accomplished by providing a cell container or casing formed of a sheet of metal composed of two different metals, each metal constituting or corresponding to the electrodes of the primary cell.

It, therefore, is an object of the present invention to provide an improved electric primary cell of the dry battery type particularly adapted to the assembly of a plurality of such cells into a higher voltage battery.

A further object of the present invention is to provide an improved sealing means for primary dry cells.

A still further object of the present invention is to provide an improved primary dry cell casing composed of two layers of metal.

A still further object of the present invention is to provide an electrolyte proof casing which is sealed with a vapor electrolyte proof cement.

A still further object of the present invention is to provide an improved casing for electric primary dry cells which is formed for complementary engagement with a portion of a similar dry cell casing.

Other and further objects of the present invention subsequently will become apparent by reference to the following description taken in connection with the accompanying drawing wherein Figure 1 is a cross sectional view of an electric primary dry cell constructed in accordance with the present invention;

Figure 2 illustrates the cooperation between individual cells and the manner in which a plurality of cells may be combined in the construction of a battery. Figure 3 is a cross sectional illustration showing one manner in which a plurality of stacks of cells may be combined into the construction of a battery.

The cell casing shown in Figure 1 is formed so that the top portion of the container is adapted to engage in a complementary manner the bottom portion of a similar casing. One manner in which this may be accomplished is by forming the casing in a generally frusto-conical shape as shown.

The casing 11 formed in frusto-conical shape as shown is made of a sheet of metal formed of two layers of metal. For example the main body 12 of the casing 11 may be of iron which is coated with a dissimilar metal to form a layer 13 which may be of zinc. While zinc and iron have been mentioned to illustrate the use of a material having two layers of dissimilar metals, other metals may be used and the sheet may be formed either in the manner commonly used for forming bi-metallic strips or by plating, galvanizing, or spraying so that the two dissimilar metals are bonded together with such security as to permit punching and shaping to form a casing similar to that shown. In a casing of this type it may be assumed that one of the electrodes of the cell is zinc and the layer of zinc 13 is provided so as to obtain a good electrical contact between the cell casing and the electrode of an adjacent cell.

Since the upper portion of the casing 11 is so formed as to be adapted to engage the lower portion of a succeeding casing, it is desired to provide an insulating layer 14 which is also to serve as a seal which is vapor and electrolyte proof. The layer 14 may comprise a cement coating having the characteristics of an excellent bonding property, great mechanical strength, and an inertness to the influence of the electrolytes used. The particular type of cement to be used depends upon the materials used in the cell structure including the electrode metals and the electrolyte. The primary requisite, however, is that the layer 14 be such as to provide a good bond between the metals and to produce an inert vapor and electrolyte proof seal. It has been found satisfactory to utilize certain thermoresponsive insulating materials of the thermoplastic or thermosetting types. For example, I have obtained satisfactory results with the use of the well known thermosetting adhesive which is available and has been on the market for several years, identified by the name "Cycleweld"; also with the use of a thermo-plastic solvent type adhesive composed of modified synthetic rubber, also available on the market, identified in the trade by the name "Pliobond"; and also a phenolic base adhesive of the polystyrene cement type.

Where the casing is formed of two metals, they should be of such order that no counter electro-motive force is produced when electrolyte is present. In the zinc-iron casing the iron provides economical mechanical strength and no electro-motive force is produced when it contacts the depolarizer pellet. The insulating layer 14 extends along the sides of the casing to substantially the bottom of the casing wall. Adjacent the bottom of the casing 11 there is positioned a depolarizer pellet 15 generally in the form of an oxide pellet. Immediately above the oxide pellet 15 there is positioned a dialyzer disk 16 which permits the passage of electrolyte between the upper and lower portions of the cell and yet restrains the movement of any solid particles. Immediately above the dialyzer disk 16 there is positioned a pressure relief disk 17 which may comprise a plurality of paper disks, the purpose of which subsequently will become apparent.

Above the pressure relief disk 17 there is an electrode 18, which may be of solid zinc, compressed powdered zinc, or a rolled spiral of zinc. The electrode 18 is of a size so as to fit loosely within the casing, and is prevented from contacting the iron terminal surface 12 by the insulating and sealing layer 14. The electrode 18 may be amalgamated with mercury to insure the purity of the surfaces of the zinc which are to make contact with each other. Sufficient electrolyte may be added to the cell in accordance with the calculated proper electrical output with respect to the zinc and oxide used. Various materials may be used for the depolarizer, electrolyte and dialyzer layers but in a typical construction the depolarizer may be composed of about 90 to 93% mercuric oxide and about 10 to about 7% graphite by weight. The dialyzer membrane is preferably of thin, high grade parchment paper, satisfactory thickness having been found to be of the order of about .006" and the electrolyte may be a solution of alkali metal hydroxide.

Figure 2 illustrates the manner in which a plurality of cells each having an outer casing 11 may be assembled in a stack to form a high voltage battery. On top of the zinc body 18 there is positioned the bottom zinc surface of the next casing 11. The sides 13 of the next casing engage the insulator sealing lining 14 so that when pressure and heat is applied between two adjacent cells a sealing action takes place. When a series of casings are permitted to cool, the thermo-responsive insulator sealing lining 14 adheres to the outer surface of the cells of the adjacent cell so that the cells are retained in position. The pressure relief disks 17 allow for sufficient movement of the zinc body 18 so that proper sealing action may be obtained and also adequate contact pressure is provided between the zinc body 18 and the zinc bottom surface of the adjacent casing 11.

Since at least the body 18 has been amalgamated with mercury, a good contact is maintained between the zinc body and the bottom of the adjacent casing. While Figure 2 merely shows two casings 11 assembled in series any number of cells may be assembled in a vertical stack, and a plurality of such vertical stacks may be housed within a common container shown in Fig. 3 provided with a plurality of separating partitions. The top casing 11 is sealed by a cap 19 having a configuration corresponding to the lower portion of the casing 11, and formed of the same material. Thus the sealing cap 19 also operates to provide the proper seal and the proper contact with the zinc body 18.

Figure 3 in a general manner illustrates how a common container 21 which may be formed of fiber board or other economical insulating material may be provided with separating partitions 22 which divide the container into compartments. Each compartment contains a stack of cells. A suitable container 24 is connected to the surface 13 of the upper cell of an inverted stack to serve as one terminal of a battery. The cap 19 in the right hand compartment of Figure 3 rests upon a conductive metal plate 25 which extends through to the adjacent compartment. Of course any other form of electrical conductor may be used to interconnect one compartment with another. The next compartment has its stack of cells arranged in an opposite direction to the first compartment. The outer surface 13 of the lower battery cell rests upon the conductive plate 25. While a greater number of compartments may be provided than shown in Figure 3 the final compartment will have its stack connected to another conductor 26 to serve as the other terminal of the battery. To illustrate this the conductor 26 is shown electrically connected to the cap 19 of the other stack of cells. It of course will be appreciated that intermediate taps may also be provided and that this illustration is merely indicative of the manner in which the invention may be applied.

While for the purpose of illustrating and describing the present invention, a frusto-conical shaped container or casing has been shown, other shapes may be employed where the top portion provides a complementary fit to the bottom portion of the next adjacent cell. Further while certain metals and materials have been specified to illustrate the present invention, other types of metals and other kinds of electrolytes may be employed while still utilizing the principles of construction defining the present invention as is indicated in the appended claims.

This invention is hereby claimed as follows:

1. A dry battery composed of a stack of primary cells, each cell comprising an imperforate bimetallic sheet metal cup having a bottom and outwardly tapered walls integral with the bottom around its marginal edges; said cups being nested into each other in interfitting relation, with the lower outside surfaces of each intermediate cup fitted within the upper inside surfaces of the next adjacent cup; the walls of the cups including a layer of insulating and sealing material extending throughout the inside area of said tapered walls; together with a cathode consisting of a depolarizing body extending across the bottom of the cup and above the lower edges of the insulating layer of the cup walls and in intimate contact with the inside metal layer of the cup across its bottom, a metallic anode in the cup above the cathode and in contact with the bottom surface of the next adjacent cup, an electrolyte within the casing, a dializer partition between the anode and the cathode, and a compressible member within the cup and between the cathode and anode; said cups being formed of bimetallic sheet metal consisting of two layers of different metals, the outer layer being of the same metal as the anode of the cell.

2. A dry battery composed of a stack of primary cells, each cell comprising an imperforate bimetallic sheet metal cup having a bottom and outwardly tapered walls integral with the bottom around its marginal edges; said cups being nested into each other in interfitting relation, with the lower outside surfaces of each intermediate cup fitted within the upper inside surfaces of the next adjacent cup; the walls of the cups including a layer of insulating and sealing material extending throughout the inside area of said tapered walls; together with a cathode, an anode and an electrolyte within the casing, a dializer partition between the anode and the cathode, and a compressible member within the cup and between the cathode and anode; said cups being formed of bimetallic sheet metal consisting of two layers of different metals, the outer layer being of the same metal as the anode of the cell.

3. A dry battery composed of a stack of primary cells, each cell comprising an imperforate bimetallic sheet metal cup having a bottom and outwardly tapered walls integral with the bottom around its marginal edges; said cups being nested into each other in interfitting relation, with the lower outside surfaces of each intermediate cup fitted within the upper inside surfaces of the next adjacent cup; the walls of the cups including a layer of insulating and sealing material extending throughout the inside area of said tapered walls; together with a cathode consisting of a depolarizing body extending across the bottom of the cup and above the lower edges of the insulating layer of the cup walls and in intimate contact with the inside metal layer of the cup across its bottom, a metallic anode in the cup above the cathode and in contact with the bottom surface of the next adjacent cup, an electrolyte within the casing, a dializer partition between the anode and the cathode, and a compressible member within the cup and between the cathode and anode.

4. A dry battery composed of a stack of primary cells, each cell comprising an imperforate bimetallic sheet metal cup having a bottom and outwardly tapered walls integral with the bottom around its marginal edges; said cups being nested into each other in interfitting relation, with the lower outside surfaces of each intermediate cup fitted within the upper inside surfaces of the next adjacent cup; the walls of the cups including a layer of insulating and sealing material extending throughout the inside area of said tapered walls; together with a cathode, an anode, and an electrolyte within the casing, a dializer partition between the anode and the cathode, and a compressible member within the cup and between the cathode and anode; said cups being formed of bimetallic sheet metal consisting of two layers of different metals.

5. A dry battery composed of a stack of primary cells, each cell comprising an imperforate bimetallic sheet metal cup having a bottom and outwardly tapered walls integral with the bottom around its marginal edges; said cups being nested into each other in interfitting relation, with the lower outside surfaces of each intermediate cup fitted within the upper inside surfaces of the next adjacent cup; with an imperforate layer of insulating and sealing material between said surfaces; together with a cathode, an anode, and a compressible member within the cup; said cups being formed of bimetallic sheet metal consisting of two layers of different metals, with one layer being of the same metal as the anode of the cell.

LA VERN EDWARD QUINNELL.

REFERENCES CITED

The following references are of record in the file of this patent:

UNITED STATES PATENTS

| Number | Name | Date |
| --- | --- | --- |
| 770,277 | Fiedler | Sept. 20, 1904 |
| 1,035,325 | Dodge | Aug. 13, 1912 |
| 1,182,202 | Parker | May 9, 1916 |
| 1,366,095 | Parker | Jan. 18, 1921 |
| 1,582,567 | Yngve | Apr. 27, 1926 |
| 1,611,153 | Benner et al. | Dec. 21, 1926 |
| 2,375,875 | Sanderson | May 15, 1945 |
| 2,422,046 | Ruben | June 10, 1947 |

FOREIGN PATENTS

| Number | Country | Date |
| --- | --- | --- |
| 363,135 | France | Apr. 25, 1906 |
| 554,926 | Great Britain | July 26, 1943 |
| 564,264 | Great Britain | Sept. 20, 1944 |